United States Patent
Jiang

(10) Patent No.: US 9,933,135 B2
(45) Date of Patent: Apr. 3, 2018

(54) STAGE LIGHTING OPTICAL SYSTEM HAVING SPOT AND BEAM EFFECTS

(71) Applicants: Guangzhou Haoyang Electronic Co., Ltd., Guangzhou (CN); Weikai Jiang, Guangzhou (CN)

(72) Inventor: Weikai Jiang, Guangzhou (CN)

(73) Assignees: Guangzhou Haoyang Electronic Co., Ltd. (CN); Weikai Jiang (CN)

( * ) Notice: Subject to any disclaimer, the term of this patent is extended or adjusted under 35 U.S.C. 154(b) by 0 days.

(21) Appl. No.: 15/122,847

(22) PCT Filed: May 26, 2014

(86) PCT No.: PCT/CN2014/078377
§ 371 (c)(1),
(2) Date: Aug. 31, 2016

(87) PCT Pub. No.: WO2015/135256
PCT Pub. Date: Sep. 17, 2015

(65) Prior Publication Data
US 2017/0074487 A1    Mar. 16, 2017

(30) Foreign Application Priority Data
Mar. 12, 2014    (CN) .......................... 2014 1 0088875

(51) Int. Cl.
*F21V 19/02*    (2006.01)
*F21V 14/02*    (2006.01)
(Continued)

(52) U.S. Cl.
CPC .............. *F21V 14/02* (2013.01); *F21S 10/00* (2013.01); *F21V 5/04* (2013.01); *F21V 11/08* (2013.01);
(Continued)

(58) Field of Classification Search
CPC . F21V 14/02; F21V 14/04; F21V 5/04; F21V 13/12; F21V 11/08; F21S 10/00;
(Continued)

(56) References Cited

U.S. PATENT DOCUMENTS 4,462,067 A    7/1984    Altman
4,519,020 A    5/1985    Little
(Continued)

FOREIGN PATENT DOCUMENTS

CN    1261136 A    7/2000
CN    203363832 U    12/2013

OTHER PUBLICATIONS

International Search Report for Application No. PCT/CN2014/078377 dated Dec. 16, 2014.

*Primary Examiner* — Alexander Garlen
(74) *Attorney, Agent, or Firm* — Lerner, David, Littenberg, Krumholz & Mentlik, LLP

(57) ABSTRACT

A stage lighting optical system includes a light source assembly from which condensed light can be emitted, an object assembly, and a zoom lens assembly, which are located in a same primary optical axis direction. Light from the light source assembly is cast by the object assembly and the zoom lens assembly. The object assembly includes an object for beam mode assembly and an object for gobo mode assembly that can be switched with each other and enter to the primary optical axis. The light source assembly can move forward or backward along the primary optical axis with respect to the object assembly. When the light source assembly moves forward to a first position with respect to the object assembly, the beam mode assembly is switched to the primary optical axis. When the object for beam mode assembly moves backwards to a second position with
(Continued)

respect to the object assembly, the object for gobo mode assembly is switched into the primary optical axis.

11 Claims, 2 Drawing Sheets

(51) Int. Cl.
    *F21V 14/04*     (2006.01)
    *F21V 5/04*     (2006.01)
    *F21V 11/08*     (2006.01)
    *F21V 13/12*     (2006.01)
    *F21S 10/00*     (2006.01)
    *G03B 21/20*     (2006.01)
    *F21W 131/105*     (2006.01)
    *F21W 131/406*     (2006.01)

(52) U.S. Cl.
    CPC .............. *F21V 13/12* (2013.01); *F21V 14/04* (2013.01); *F21S 10/007* (2013.01); *F21W 2131/105* (2013.01); *F21W 2131/406* (2013.01); *G03B 21/2046* (2013.01); *G03B 21/2066* (2013.01)

(58) Field of Classification Search
    CPC ............ F21S 10/007; F21W 2131/406; F21W 2131/105; G03B 21/2066; G03B 21/2046
    See application file for complete search history.

(56) References Cited

U.S. PATENT DOCUMENTS

| | | | |
|---|---|---|---|
| 5,113,332 A | 5/1992 | Richardson | |
| 6,837,596 B2* | 1/2005 | Tanaka | F21S 10/007 359/823 |
| 2011/0227507 A1* | 9/2011 | Salm | F21S 10/02 315/312 |
| 2012/0155102 A1* | 6/2012 | Melzner | F21V 5/002 362/510 |
| 2013/0094215 A1* | 4/2013 | Jurik | F21S 10/007 362/296.01 |

* cited by examiner

STAGE LIGHTING OPTICAL SYSTEM HAVING SPOT AND BEAM EFFECTS

CROSS REFERENCE TO RELATED APPLICATIONS

The present application is a national phase entry under 35 U.S.C. § 371 of International Application No. PCT/CN2014/078377, filed May 26, 2014, which claims priority from Chinese Patent Application No. 201410088875.1, filed Mar. 12, 2014, all of which are hereby incorporated herein by reference.

TECHNICAL FIELD

The present invention relates to a stage lighting optical system having spot and beam effects.

BACKGROUND

At present, in the field of stage lighting, the most widely used functional lamps mainly include three types: spot lights, beam lights, and wash lights, respectively. The stage designers and users tend to the targeted choice of different functional lights according to their requirements. However, due to the single usage, different types of lights are required to be changed and used in a complicated stage scene, which is extremely complicated to operate. In order to solve this problem, a stage lighting realizing various beam effects has also been proposed in the prior art.

Chinese patent CN201320192500.0 has disclosed a stage lighting system including various beam effects simultaneously, which comprises a light source, a reflective bowl, a first optical assembly, and a second optical assembly. Said first optical assembly is located between the reflective bowl and the second optical assembly in a primary optical axis direction. The switchover of the various beam effects is realized through the movement of the first optical assembly. After emitted by the light source, the light passes through the reflective bowl, the second optical assembly, and then a light pillar with a middle beam that is so gathered is formed. Since the middle beam is condensed, the whole light pillar seems to have an obvious beam feeling, and when the beam shines on an imaging plane, there is obvious layering feeling between the spot centre and the spot edge. The above description is the lighting effect of the beam light. After the first optical assembly is added, the beam reflected from the reflective bowl is diverged by the first optical assembly, and then passes through the second optical assembly. The original gathered beam becomes diverged, and when the beam shines on an imaging plane, the effect of the whole imaging spot is relatively uniform. This is the lighting effect of the spot light.

In this structure, the effect of the uniform light or beam is realized through increasing or decreasing the first optical assembly, that is, through increasing or decreasing lens or light guide. However, uniform light and beam are two very different lighting effects. The former one is to diverge light, and the latter one is to condense light. With regard to the structure of the above-mentioned patent, the first optical assembly is located between the light source and the second optical assembly. If it needs to be added directly, it is necessary to reserve sufficient space, which brings certain disadvantages to the choice of the light source. If the space between the light source and the second optical assembly is relatively small, the practicability will be relatively poor. In addition, when switching from the beam effect to the spot effect, and the first optical assembly moves into the position of the primary optical axis, the optimal parameter of the optical position of the first optical assembly, such as light guide, or the light guide and lens assembly has not been considered, leading to relatively big light loss and poor lighting effect of the spot effect light that is eventually realized.

SUMMARY OF THE PRESENT INVENTION

The technical problem to be solved by the present invention is that, it is necessary to provide a stage lighting optical system having spot and beam effects with low light loss and high utilization efficiency.

In order to solve the above-described technical problem, the following technical solutions have been adopted in the present invention: a stage lighting optical system having spot and beam effects, comprises a light source assembly from which condensed light can be emitted, an object assembly, and a zoom lens assembly, which are located in a same primary optical axis direction. The light from said light source assembly is cast by the object assembly and the zoom lens assembly. Wherein, said object assembly include an object for beam mode assembly and an object for gobo mode assembly that can be switched with each other and enter to the primary optical axis. Said light source assembly can move forward or backward along the primary optical axis with respect to the object assembly. When the light source assembly moves forward to a first position with respect to the object assembly, the object for beam mode assembly is switched to the primary optical axis. When the light source assembly moves backward to a second position with respect to the object assembly, the object for gobo mode assembly is switched to the primary optical axis.

In the present solution, when beam light effect is required, the object for beam mode assembly is switched into the primary optical axis, while the light source assembly is disposed on the first position. When spot light effect is required, the object for gobo mode assembly is switched into the primary optical axis, while the light source assembly is disposed on the second position. The switchover of the beam light and the spot light is realized through changing the light condensing position of the light source, and the rapid switchover of lights with different effects is realized.

When said light source assembly is located at the first position, the light condensing position of the light source assembly is located on the object for beam mode assembly or located at a position close to the object for beam mode assembly.

When said light source assembly is located at the first position, the distance between the luminescence centre of the light source assembly and the object assembly is 38-50 mm.

The moving distance of said second position with respect to the first position is x, the diameter of the pattern on the object for gobo mode assembly is 2y', the radius of the pattern of the object for beam mode assembly is y, the value of y is 5-8 mm, and (y'−y)/x=tan 30°.

When said light source assembly is located at the second position, the distance between the luminescence centre of the light source assembly and the object assembly is 50-75 mm.

The inner diameter of the aperture on said beam design assembly is 5-8 mm. The inner diameter of the aperture on said object for gobo mode assembly is 12-15 mm.

Said light source assembly includes a light-emitting element and a reflector, and the light-emitting element emits condensed light through the reflector.

The coordinative use of the zoom lens assembly and the object for beam mode assembly realizes a zoom of the angle between the beam and the primary optical axis in the range of 0° to 15°. The coordinative use of the zoom lens assembly and the object for gobo mode assembly realizes a zoom of the angle between the beam and the primary optical axis in the range of 4° to 30°.

Said zoom lens assembly consists of three sets of lens assemblies, which are in the following order along rays output direction: a focusing set, a zoom set and a fixing set.

Compared with the prior art, the beneficial effects of the present invention are as follows:

In the present invention, the light condensing position of the light source is changed through moving the relative position of the light source assembly and the object assembly, and coordinating with the switchover of the object for beam mode assembly and the object for gobo mode assembly, and thereby the change of the beam light and the spot light is realized, without inserting other optical assemblies to the prior art, and the rapid switchover of the lights with different effects can be realized.

DETAILED DESCRIPTION OF THE PREFERRED EMBODIMENT

The present invention is further described below in combination with specific embodiments.

Figure 1:
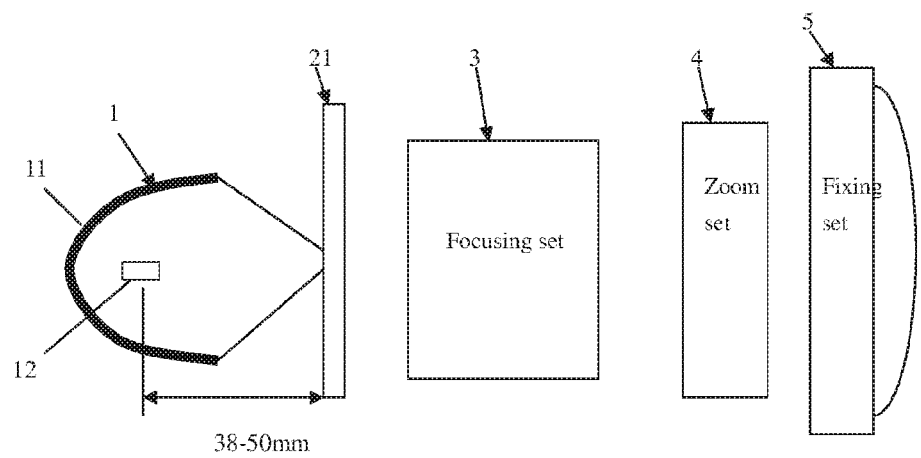
FIG. 1 is a schematic view of the whole light path structure when switching to beam effect according to the present invention.
Figure 2:
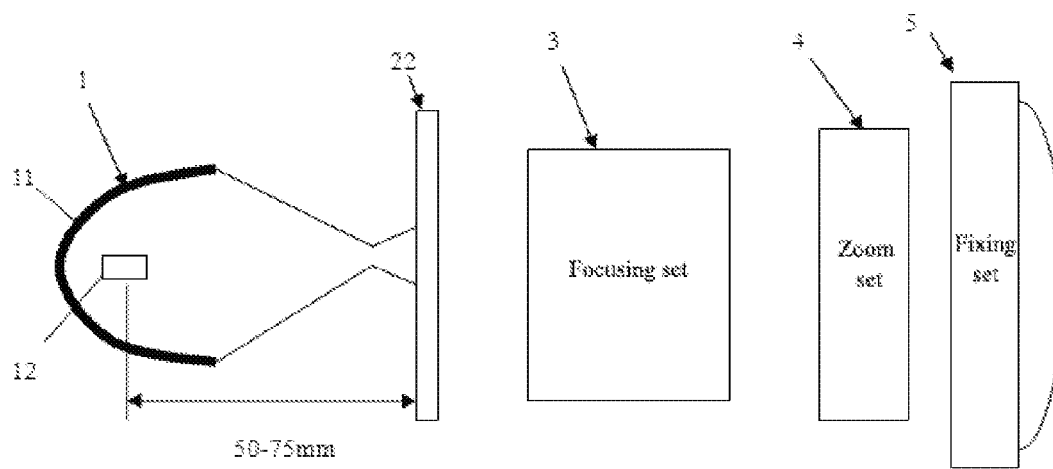
FIG. 2 is a schematic view of the whole light path structure when switching to spot effect according to the present invention.

As shown in FIG. 1 and FIG. 2, the present invention discloses a stage lighting optical system having spot and beam effects, comprising a light source assembly 1 from which condensed light can be emitted, an object assembly, and a zoom lens assembly, which are located in a same primary optical axis direction. The light from said light source assembly 1 is cast by the object assembly and the zoom lens assembly. Wherein, said object assembly include an object for beam mode assembly 21 and an object for gobo mode assembly 22 that can be switched with each other and enter to the primary optical axis. Said light source assembly 1 can move forward or backward along the primary optical axis with respect to the object assembly. When the light source assembly 1 moves forward to a first position with respect to the object assembly, the object for beam mode assembly 21 is switched into the primary optical axis. When the light source assembly 1 moves backward to a second position with respect to the object assembly, the object for gobo mode assembly 22 is switched into the primary optical axis.

In the present system, according to the requirement of rays output effect, the switchover of the spot light and the beam light may be performed. When beam light effect is required, the object for beam mode assembly is switched into the primary optical axis, while the light source assembly is disposed on the first position. When spot light effect is required, the object for gobo mode assembly is switched into the primary optical axis, while the light source assembly is disposed on the second position. The first position is closer to the position of the object assembly than the second position. When the light source assembly is disposed on the first position, the light condensing position of the light source assembly may be generally located on the object for beam mode assembly, such that a strong beam effect can be produced after passing through the aperture on the object for beam mode assembly and proceeding with zoom and dimming. When the light source assembly is disposed on the second position, before entering into the object assembly, the light is condensed first, then is cast divergently, and then passes through the object for gobo mode assembly. A uniform spot effect can be produced after the light being condensed then diverged and then proceeded with zoom and dimming. In the present invention, the switchover of the beam light and the spot light is realized through changing the light condensing position of the light source, without adding other optical assemblies to realize the switchover of the lights with different effects.

The forward or backward movement of the light source assembly of the above-mentioned system may be driven by a transmission mechanism, such as a transmission bar and a driving motor thereof. The switchover of the object assembly may be realized by a rotating disk, i.e. the switchover of the object for beam mode assembly and the object for gobo mode assembly is realized by the rotating disk, and only one of the object assembly enters into the primary optical axis. The automatic control of the coordination of the above-described motions is realized by a controller.

In this embodiment, said light source assembly 1 includes a light-emitting element 12 and a reflector 11, and the light-emitting element 12 emits condensed light through the reflector 11. The light-emitting element may be Philips 470 W series light source, which coordinates with the reflector, so that the light source assembly possesses high rays output efficiency and small size.

Further, in order to achieve better beam effect, when said light source assembly is located at the first position, the distance between the luminescence centre of the light source assembly and the object assembly is 38-50 mm.

Figure 3:
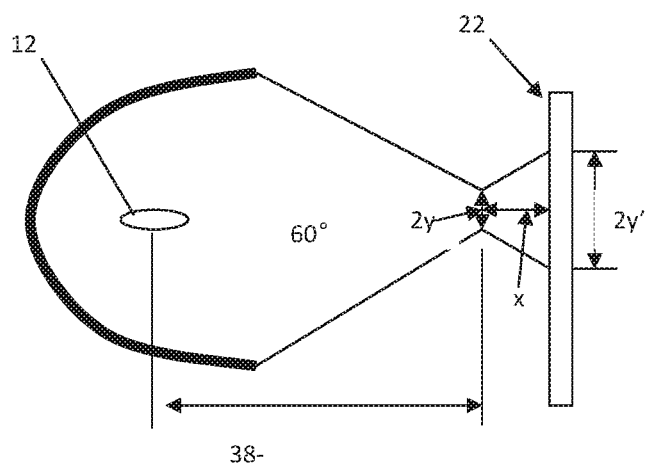
FIG. 3 is a schematic view of the partial the light path structure when the light source assembly is located at the second position.

Further, as shown in FIG. 3, the moving distance of said second position with respect to the first position is x, the diameter of the pattern on the object for gobo mode assembly is 2y', the radius of the pattern of the object for beam mode assembly is y, the value of y is 5-8 mm, and $(y'-y)/x = \tan 30°$. In this embodiment, the moving distance x may be determined according to value 2y' of the diameter of the pattern, and the rays output effect can be adjusted flexibly.

When said light source assembly is located at the second position, the distance between the luminescence centre of the light source assembly and the object assembly is 50-75 mm.

In order to achieve more condensed beam effect, and coordinate with a condensed light spot, the inner diameter of the aperture on said object for beam mode assembly is 5-8 mm. The inner diameter of the aperture on said object for gobo mode assembly is 12-15 mm.

The coordinative use of the zoom lens assembly and the object for beam mode assembly realizes a zoom of the angle between the beam and the primary optical axis in the range of 0° to 15°. The coordinative use of the zoom lens assembly and the object for gobo mode assembly realizes a zoom of the angle between the beam and the primary optical axis in the range of 4° to 30°.

Specifically, said zoom lens assembly consists of three sets of lens assemblies, which are in the following order along rays output direction: a focusing set, a zoom set and a fixing set.

Apparently, the above-described embodiments of the present invention are just embodiments for describing the present invention clearly, but not limitation to the implementations of the present invention. For those having ordinary skill in the art, variations or changes in different forms can be made on the basis of the above description. All of the implementations should not and could not be exhaustive herein. Any amendments, equivalent replacements and improvement made within the spirit and principle of the present invention shall all be included within the scope of protection of the claims of the present invention.

What is claimed:

1. A stage lighting optical system having spot and beam effects, comprising a light source assembly from which condensed light can be emitted, an object assembly, and a zoom lens assembly, which are located in a same primary optical axis direction, the light source assembly including a light emitting element and a reflector, the light from said light source assembly being cast by the object assembly and the zoom lens assembly, characterized in that said object assembly includes an object for gobo mode assembly and a separate object for beam mode assembly that can be switched with each other and enter to the primary optical axis; the light emitting element and the reflector of said light source assembly configured to move forward or backward together along the primary optical axis with respect to the object assembly between a first and second position; when the light source assembly moves forward to the first position with respect to the object assembly, the object for beam mode assembly is switched independently from the object for gobo mode assembly to the primary optical axis; and when the light source assembly moves backward to the second position with respect to the object assembly, the object for gobo mode assembly is switched independently from the object for beam mode assembly to the primary optical axis.

2. The stage lighting optical system having spot and beam effects according to claim 1, wherein, when said light source assembly is located at the first position, the light condensing position of the light source assembly is located on the object for beam mode assembly or located at a position close to the object for beam mode assembly.

3. The stage lighting optical system having spot and beam effects according to claim 1, wherein, when said light source assembly is located at the first position, the distance between the luminescence center of the light source assembly and the object assembly is 38-50 mm.

4. The stage lighting optical system having spot and beam effects according to claim 1, wherein, the moving distance of said second position with respect to the first position is x, the diameter of the pattern on the object for gobo mode assembly is 2y', the radius of the pattern of the object for beam mode assembly is y, the value of y is 5-8 mm, and $(y'-y)/x=\tan 30°$.

5. The stage lighting optical system having spot and beam effects according to claim 1, wherein, when said light source assembly is located at the second position, the distance between the luminescence center of the light source assembly and the object assembly is 50-75 mm.

6. The stage lighting optical system having spot and beam effects according to claim 1, wherein, the inner diameter of the aperture on said object for beam mode assembly is 5-8 mm.

7. The stage lighting optical system having spot and beam effects according to claim 1, wherein, the inner diameter of the aperture on said object for gobo mode assembly is 12-15 mm.

8. The stage lighting optical system having spot and beam effects according to claim 1, wherein the light-emitting element emits condensed light through the reflector.

9. The stage lighting optical system having spot and beam effects according to claim 1, wherein, the coordinative use of the zoom lens assembly and the beam design assembly realizes a zoom of the angle between the beam and the primary optical axis in the range of 0° to 15°, or, the coordinative use of the zoom lens assembly and the object for gobo mode assembly realizes a zoom of the angle between the beam and the primary optical axis in the range of 4° to 30°.

10. The stage lighting optical system having spot and beam effects according to claim 1, wherein, said zoom lens assembly consists of three sets of lens assemblies, which are in the following order along rays output direction: a focusing set, a zoom set and a fixing set.

11. The stage lighting optical system having spot and beam effects according to claim 1, wherein light from the light source is condensed before the object for gobo mode assembly when the light source assembly is in the second position.

* * * * *